March 31, 1970 W. H. BAUER 3,504,064
METHOD OF COMPRESSING AND SUBSEQUENTLY RE-EXPANDING
UREA-FORMALDEHYDE FOAM
Filed Feb. 26, 1968
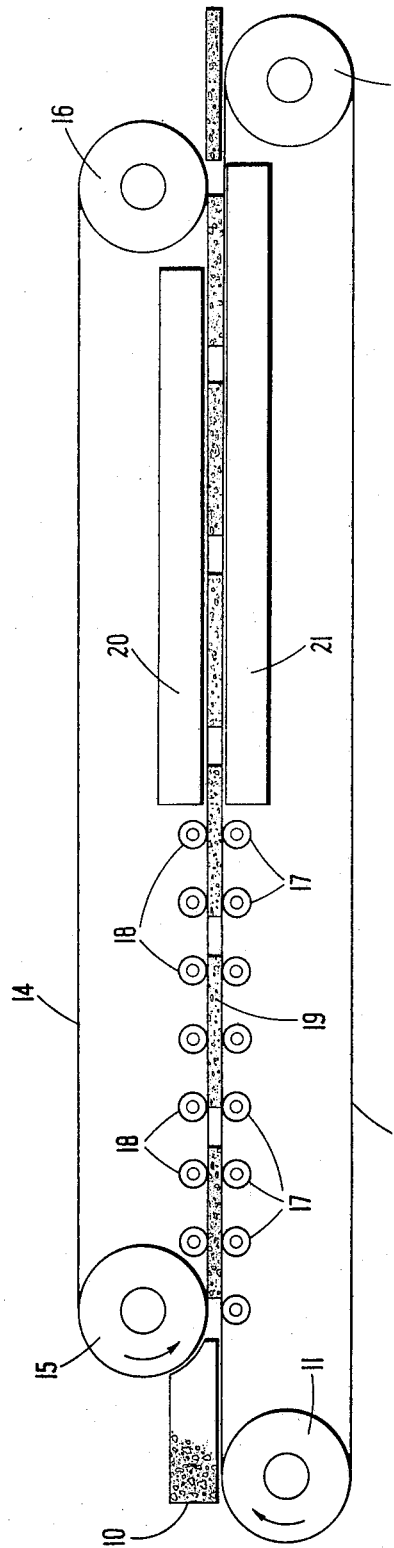
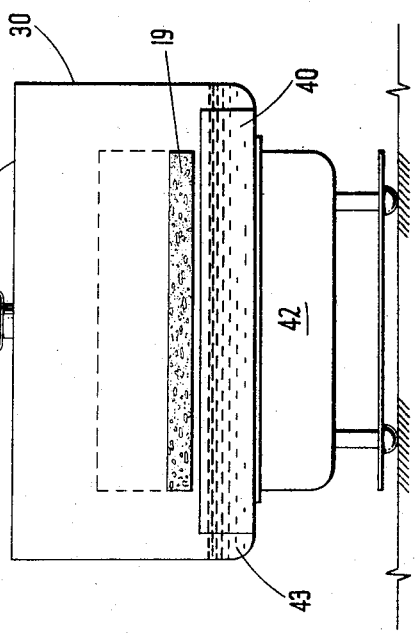
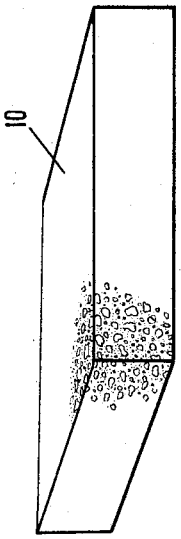
INVENTOR
William H. Bauer
BY
Wolf, Greenfield & Sieken United States Patent Office 3,504,064
Patented Mar. 31, 1970

3,504,064
METHOD OF COMPRESSING AND SUBSEQUENTLY RE-EXPANDING UREA-FORMALDEHYDE FOAM
William H. Bauer, Medway, Mass., assignor to Floral Development Corp., Holliston, Mass., a corporation of Massachusetts
Filed Feb. 26, 1968, Ser. No. 708,396
Int. Cl. B29d 27/00; B29h 7/20; B29g 7/02
U.S. Cl. 264—28   8 Claims

ABSTRACT OF THE DISCLOSURE

A method of compressing foam plastic articles to permit subsequent re-forming for shipment and use respectively is provided. Preferably a urea-formaldehyde foam, shaped article having a first form is compressed while wet with the use of heat and pressure, after which the article is cooled to harden the foam in the compressed form. Subsequently, the foam article can be heated to restore the foam to substantially the first form.

BACKGROUND OF THE INVENTION

Low density urea-formaldehyde foam articles such as rectangular blocks for use as floral display bases are well-known in the art. Often the urea-formaldehyde foam is manufactured at one location and shipped long distances for sale at distant locations. Because of the inherent bulk of foam materials, and their low density, often shipping and storage areas required are large. This results in high shipping charges and inefficient storage.

SUMMARY OF THE INVENTION

According to the invention, urea-formaldehyde foam articles are compressed for shipment or storage by preferably mechanically compressing the foam while wet. The foam preferably has an initial wet density of from 5 to 10 lbs. per cubic ft. and is heated to a temperature of from 150° F. to 212° F. during the compression step. Surprisingly, when the foam is wet, it can be resiliently compressed. Preferably the foam is reduced in volume by from 75 to 90% to give it a compressed wet density of from 30 to 42 lbs. per cubic ft. The foam is hardened in its compressed form by cooling it while under pressure to a temperature in the range of from 32° F. to 70° F.

In re-forming the foam to its initial form, it is heated preferably in the presence of steam and preferably without the use of a molding cavity to restore the urea-formaldehyde foam to substantially its first or starting form. The foam is believed to expand to its orginal form as a result of its inherent elastic memory. Preferably the compressed foam is heated to a temperature in the range of from 150° F. to 212° F. to expand to its original configuration.

The method of this invention can be carried out rapidly at low cost. The compressed foam offers substantial savings in storage and shipment. The compressed foam can be stored for long periods of time at ordinary environmental conditions without affecting its ability to be re-expanded to its original form by the use of an inexpensive and rapid method. The properties of the foam after compression and expansion in accordance with this invention are substantially identical to the properties of the foam before processing.

BRIEF DESCRIPTION OF THE DRAWINGS

The above features and advantages of the present invention will be better understood with reference to the following specification when read in connection with the accompanying drawings in which:

FIG. 1 is a perspective view of a foam block to be treated in accordance with the preferred embodiment of this invention;
FIG. 2 is a semidiagrammatic sketch illustrating compression of the foam; and,
FIG. 3 is a semidiagrammatic sketch illustrating re-forming of the foam to its original shape.

DESCRIPTION OF THE PREFERRED EMBODIMENTS

The urea-formtldehyde foam articles processed according to this invention can be of a variety of sizes and configurations. In the preferred embodiment, blocks such as shown at 10 in FIG. 1 having a lentgh of 9 inches, a width of 4 inches and a height of 3 inches are processed. Such blocks are particularly suitable for use as bases for fresh cut flowers. The foam blocks can be produced by a number of different known methods including that shown and described in United States Patent 3,284,379 issued Nov. 8, 1966. The foam blocks in use are highly frangible permitting positioning of a flower stem in a block with the block having sufficient strength to support the stem in an upright position. Many interconnecting passageways are found in the blocks which aid in transmitting water to the stem of the flow when the block is wet.

Preferably the wet density of the expanded foam processed is in the range of from 5 to 32 lbs. per cubic ft. with a dry density of from ½ to 10 lbs. per cubic ft.

In a first step, urea-formaldehyde foam is selected for processing by the method of this invention directly after foam formation while it still retains heat of formation and the water used in the foam forming step. Alternately the foam can be formed and substantially dried after which it is wet preferably with water, prior to processing. In all cases it is preferred that the foam have a water content of at least 10% by weight of the foam and preferably be saturated.

The wet foam, preferably at a temperature in the range of from 150° F. to 212° F., is then passed to a compression area as semidiagrammatically shown at FIG. 2. Rolls 11 and 12 carry an endless stainless steel belt 13 with an upper endless stainless steel belt 14 overlying the lower belt 13 and mounted on rolls 15 and 16. Supplementary rollers such as indicated at 17 and 18 can be provided to maintain the facing portions of the endless belts 13 and 14 substantially parallel to each other.

The heated block 10 or preferably a plurality of heated blocks 10 are successively passed under roll 15 and compressed to a volume preferably from 75 to 90% of their original volume while maintained in a temperature in the range of from 150° F. to 212° F. It is found that the blocks 10 when wet and at the stated temperature range can be resiliently compressed to the form shown at 19 in FIG. 2, where they are substantially flattened but not substantially changed in width or length. The compressed blocks 19 are then passed through a cooling zone formed by coolant chambers 20 and 21 carrying conventional refrigeration pipes through which a refrigeration fluid is passed.

The cooling zone preferably cools the blocks to a temperature below 70° F. at which the blocks are hardened in their compressed form and passed out of the compression area over roll 12.

The compressed blocks 19 are stable, i.e., will not decompose or crack during ordinary handling at ordinary environmental conditions for long periods of time. These blocks can be shipped or stored with great savings of storage and shipping space.

Re-forming or expansion of the blocks to their original shape is carried out by heating the blocks preferably in the presence of steam to a temperature preferably in the range of from 150° F. to 212° F. preferably for a time period of from 5 to 15 minutes or until the foam has expanded to substantially its original shape. It has been found that no confining mold cavity need be used, but, the blocks can be allowed to expand freely in a heated, water vapor atmosphere. The blocks expand substantially uniformly to their original shape.

As semidiagrammatically shown in FIG. 3, an aluminum cooker 30 is provided with a metal stand 40 on which a compressed block 19 is placed. Cover 41 closes the cooker to the atmosphere but allows escape of steam should the pressure build up beyond atmospheric pressure. A hot plate 42 is located beneath the cooker 30 and is used to heat water 43 to the boiling point to provide a heated steam atmosphere about the block 19.

In a specific example of the method of this invention, urea-formaldehyde foam is produced by the method of the U.S. Patent 3,284,379 issued Nov. 8, 1966. Urac 180, a urea-formaldehyde resin and water are mixed in a tank along with Arquad S50 (a trade name product of Armour Industrial Chemical Company of Chicago, Ill.). After thorough mixing, the resin mixture is pumped into a blender and treated with phosphoric acid. Wet foam produced is extruded with a wet density of 3.6 grams per cubic centimeter and a pH of approximately 2.5 with the dry weight of the foam if dried, being about 1.75 lbs. per cubic ft. Blocks are molded from the foam immediately after extrusion. While the blocks are still damp, they are treated with ammonia gas to neutralize the blocks and bring them to a pH of approximately 8. Wet, neutralized blocks, containing approximately 70% by weight water and having a density of 6 lbs. per cubic ft. are then processed in accordance with the present invention by heating them to a temperature of 212° F. and passing them through an apparatus of the type shown in FIG. 2. The blocks have an original form with dimensions of 3 inch height, 4 inch width and 9 inch length. The outer surfaces are substantially planar in the sense that planes are formed by the outer limits of the block although each surface appears as shown in FIG. 1, i.e., as if a cut were made in a foam body. After passage under roll 15, the blocks are compressed to ½ inch height, 4 inch width, 9 inch length and are passed into a cooling chamber and cooled by coolant 20–21 to a temperature of 32° F. The resultant compressed blocks have a density of 30 lbs. per cubic ft. When rolls 15, 16, 11 and 12 have a length of 50 ft., steel belts 14 and 13 have a width of 32 inches and a length of approximately 50 ft. 7 blocks across the width of the belt can be processed at a rate of 300 ft. per hour of belt movement. The compressed blocks 19 can be stored for long periods of time preferably while wet.

In the expanding step of this invention, one of the blocks 19 having a moisture content of 70% by weight is placed in an aluminum cooker of the type shown in FIG. 3 having a diameter of 12 inches and a height of 10 inches. 16 ounces of water are placed below the level of the block as shown in FIG. 3 and a heater 42 is activated to bring the water to its boiling point. The lid 41 is placed on the cooker and the water allowed to boil at 212° F. and generate steam for a period of 10 minutes. At the end of the 10 minute period, it is found that the block 19 expands to its original form having a height of 3 inches, a width of 4 inches and a length of 9 inches. The reconstituted foam block when cooled to room temperature, is highly frangible and has substantially the same physical properties as an original block 10 before compression. The outside surfaces of the block are substantially planar and correspond to the substantially planar outside surfaces of the block before compression.

While specific embodiments of this invention have been shown and described, it should be understood that many variations thereof are possible. For example, the specific apparatus used for compressing and expanding the urea-formaldehyde foam can vary greatly. In all cases, it is preferred that the urea-formaldehyde foam be wet during the compression step and cooled and hardened while under compression. The foam is preferably wet with an aqueous liquid which is nonreactive with the foam. Water is preferred and can have incorporated therein reaction products of the foaming or neutralizing steps. While it is preferred to re-expand the foam with the use of heat and steam, in some cases heat alone can be used and/or the foam can be dry when expanded. Preferably the compressed foam comprises at least 10% by weight of water when processed to expand it.

In view of the many modifications possible, this invention is to be limited only by the spirit and scope of the appended claims.

What is claimed is:

1. A method of compressing frangible urea-formaldehyde foam articles to permit subsequent re-forming of said articles,
   comprising compressing a shaped article of urea-formaldehyde foam having interconnecting passageways therein and having a first form with a wet density of from 5 to 32 lbs. per cubic ft. while said foam has incorporated therein at least 10% by weight of water,
   said compressing being carried out with said foam and said water being at a temperature of from 150° F. to 212° F.,
   cooling said foam at a temperature below 70° F. to harden said foam in a compressed form, and heating said foam, while said foam contains at least 10% by weight water, at a temperature in the range of from 150° F. to 212° F. to restore said foam to said first form.

2. A method in accordance with the method of claim 1 wherein said foam is heated at a temperature in the range of from 150° F. to 212° F. for a period of from 5 to 15 minutes.

3. A method in accordance with the method of claim 1 wherein said foam is saturated with water,
   and said compressing step is carried out by applying pressure to two opposed sides of said foam form.

4. A method of compressing urea-formaldehyde foam in accordance with claim 1 and further comprising,
   heating said foam to a temperature of 212° F. in the presence of steam to cause said foam to expand to its original shape.

5. A method in accordance with the method of claim 4 wherein said foam has a wet density of 5 to 32 lbs. per cubic ft. prior to said compressing and after said expanding.

6. A method in accordance with claim 1 wherein said foam is saturated and has a density of about 6 lbs. per cubic ft. prior to said compression.

7. A method of compressing frangible, urea-formaldehyde foam articles to permit subsequent re-forming of said articles,
   said method comprising,
   compressing a shaped article of urea-formaldehyde foam having interconnecting passageways therein and being receptive to water, said foam having a first form with a dry density of from ½ to 10 lbs. per cubic ft.,
   said compressing being carried out while said foam has incorporated therein at least 10% by weight of water with said foam and said water being at a temperature in the range of from 150° F. to 212° F.,
   and cooling said foam at a temperature in the range of from 32° F. to 70° F. to harden said foam in a compressed form with said foam retaining at least 10% by weight of water whereby said foam can be re-expanded to said first form by application of heat with said so expanded foam having the properties of said foam before said compressing step.

8. A method in accordance with the method of claim 7 wherein said compressing step is carried out with said urea-formaldehyde foam being saturated with water and compressed to a volume of from 75 to 90% of its original uncompressed volume.

References Cited

UNITED STATES PATENTS

| | | | |
|---|---|---|---|
| 2,384,387 | 9/1945 | Meyer | 264—321 X |
| 2,933,767 | 4/1960 | Vieli | 264—321 X |
| 3,000,464 | 9/1961 | Watters | 264—321 X |
| 3,125,621 | 3/1964 | Coppick | 264—321 |
| 3,284,379 | 11/1966 | Brasco | 260—60 X |

JULIUS FROME, Primary Examiner

P. A. LEIPOLD, Assistant Examiner

U.S. Cl. X.R.

264—51, 82, 237, 321